United States Patent
Kim et al.

(10) Patent No.: US 9,939,973 B2
(45) Date of Patent: Apr. 10, 2018

(54) DISPLAY DEVICE INCLUDING A TOUCH SENSOR

(71) Applicant: Samsung Display Co., Ltd., Yongin (KR)

(72) Inventors: Jong Seong Kim, Seoul (KR); Kwang Ho Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 189 days.

(21) Appl. No.: 14/798,742

(22) Filed: Jul. 14, 2015

(65) Prior Publication Data
US 2016/0195969 A1 Jul. 7, 2016

(30) Foreign Application Priority Data
Jan. 5, 2015 (KR) .................. 10-2015-0000687

(51) Int. Cl.
G06F 3/041 (2006.01)
G06F 3/044 (2006.01)

(52) U.S. Cl.
CPC .................. G06F 3/044 (2013.01)

(58) Field of Classification Search
CPC .................. G06F 3/044; G06F 3/0412
See application file for complete search history.

(56) References Cited

U.S. PATENT DOCUMENTS

| | | | |
|---|---|---|---|
| 7,551,245 B2 | 6/2009 | Ben-Shalom et al. | |
| 8,144,289 B2 * | 3/2012 | Chen | G02F 1/1337 345/92 |
| 8,956,891 B2 * | 2/2015 | Chida | H01L 33/62 257/E21.567 |
| 9,356,049 B2 * | 5/2016 | Ikeda | H01L 27/1218 |
| 9,401,479 B2 * | 7/2016 | Lee | H01L 51/0024 |
| 9,501,165 B2 * | 11/2016 | Kim | G06F 3/0412 |
| 2006/0097957 A1 * | 5/2006 | Ben-Shalom | G02F 1/13336 345/18 |
| 2008/0291145 A1 * | 11/2008 | Chen | G02F 1/1337 345/92 |
| 2011/0043465 A1 * | 2/2011 | Huang | G06F 3/045 345/173 |
| 2012/0062485 A1 | 3/2012 | Kim | |
| 2014/0062916 A1 * | 3/2014 | Hong | G06F 3/041 345/173 |

(Continued)

FOREIGN PATENT DOCUMENTS

| | | |
|---|---|---|
| KR | 10-2002-0024624 | 4/2002 |
| KR | 10-2005-0086891 | 8/2005 |
| KR | 10-2009-0053461 | 5/2009 |

*Primary Examiner* — Peter D McLoone
(74) *Attorney, Agent, or Firm* — H.C. Park & Associates, PLC (57) ABSTRACT

A display device includes: a display panel having: a lower substrate; an upper substrate facing the lower substrate and having at least one through hole formed therein; a display active layer disposed between the lower substrate and the upper substrate; at least one lower pad disposed on the lower substrate; a touch sensing layer disposed on the upper substrate; and at least one connection pad disposed on the upper substrate. The connection pads are electrically connected to the lower pads through connectors disposed in the though holes of the upper substrate.

16 Claims, 10 Drawing Sheets

(56) References Cited

U.S. PATENT DOCUMENTS

| | | | |
|---|---|---|---|
| 2014/0152912 A1* | 6/2014 | Lee | G06F 3/0412 |
| | | | 349/12 |
| 2014/0264425 A1* | 9/2014 | Chida | H01L 33/20 |
| | | | 257/99 |
| 2015/0016126 A1* | 1/2015 | Hirakata | F21V 15/012 |
| | | | 362/418 |
| 2015/0028328 A1* | 1/2015 | Ikeda | H01L 27/1218 |
| | | | 257/43 |
| 2015/0130726 A1* | 5/2015 | Min | G06F 3/0412 |
| | | | 345/173 |
| 2015/0185942 A1* | 7/2015 | Kim | G06F 3/0412 |
| | | | 345/173 |
| 2015/0255722 A1* | 9/2015 | Lee | H01L 51/0024 |
| | | | 438/25 |
| 2015/0370347 A1* | 12/2015 | Jin | G06F 1/16 |
| | | | 345/173 |
| 2016/0188059 A1* | 6/2016 | Lee | G06F 3/0416 |
| | | | 345/173 |
| 2016/0216736 A1* | 7/2016 | Hong | G06F 3/0412 |

* cited by examiner

FIG. 12

DISPLAY DEVICE INCLUDING A TOUCH SENSOR

CROSS-REFERENCE TO RELATED APPLICATION

This application claims priority from and the benefit of Korean Patent Application No. 10-2015-0000687, filed on Jan. 5, 2015, which is hereby incorporated by reference for all purposes as if fully set forth herein.

BACKGROUND

Field

Exemplary embodiments relate to a display device, and more particularly, to a display device including a touch sensor.

Discussion of the Background

A flat panel display (FPD) such as an organic light emitting diode display (OLED), a liquid crystal display (LCD), and an electrophoretic display (EPD) includes a display panel including a field generating electrode and an electro-optical active layer. As the electro-optical active layer, the display panel of the organic light emitting device includes an organic emission layer, and the display panel of the liquid crystal display includes a liquid crystal layer. The field generating electrode is connected to a switching device such as a thin film transistor to receive a data signal, and the electro-optical active layer converts the data signal to an optical signal to display an image.

The display device may include a touch sensing function which can interact with a user in addition to the function of displaying an image. The touch sensing function is used to determine touch information, such as whether an object touches a screen, and the position of the touch by sensing the change in pressure, charge, light, and the like, which are applied when the user touches the screen with a finger or touch pen. The display device may also receive an image signal based on the touch information.

The touch sensing function may be realized by a touch sensor including a touch electrode. A touch sensor may be classified into types according to the formation position of the touch electrode. Among these types, an on-cell type is accomplished by forming the touch electrode on a substrate of the display panel.

Such a display panel requires a region for mounting a display integrated circuit chip or attaching a flexible circuit board (FPCB). Such a region is called dead space since it occupies a space in which other constituent elements of the display device may be disposed. The on-cell type of touch sensor requires an additional region for attaching a flexible circuit board for a touch sensor to the display panel, enlarging the dead space. As the display panel slims, a side of the substrate close to the pad unit is particularly vulnerable to side impact.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device including a touch sensor.

Additional aspects will be set forth in the detailed description which follows, and, in part, will be apparent from the disclosure, or may be learned by practice of the inventive concept.

An exemplary embodiment discloses a display panel having a lower substrate, an upper substrate facing the lower substrate, and a through hole formed therein. The display panel may further include a display active layer disposed between the lower substrate and the upper substrate, a lower pad disposed on the lower substrate, a touch sensing layer disposed on the upper substrate, and a connection pad disposed on the upper substrate wherein the connection pad is electrically connected to the lower pad through a connector disposed in the though hole of the upper substrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A display device according to an exemplary embodiment will be described in detail with reference to the accompanying drawings. Hereinafter, even though embodiments are mainly described in association with an organic light emitting diode display, exemplary embodiments may be applied to other display devices, such as a LCD or EPD.

A display device according to an exemplary embodiment will now be described with reference to FIG. 1 to FIG. 6.

Figure 1:
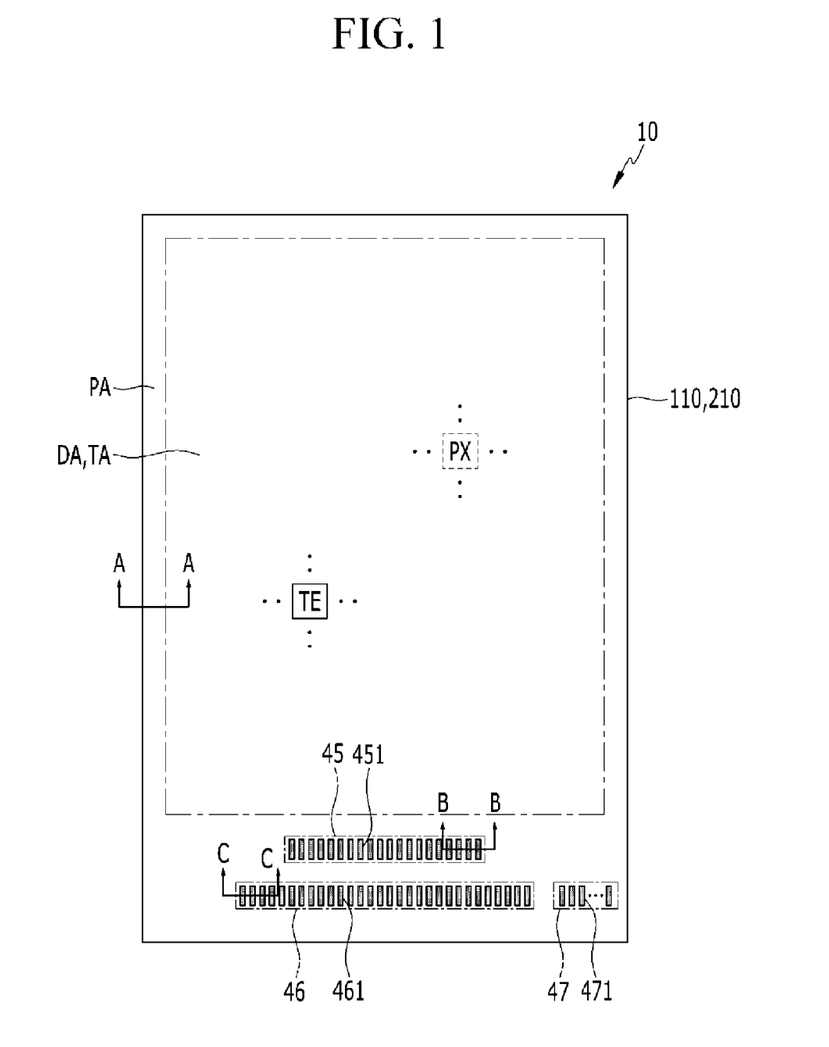
FIG. 1 schematically illustrates a display device according to an exemplary embodiment.
Figure 2:
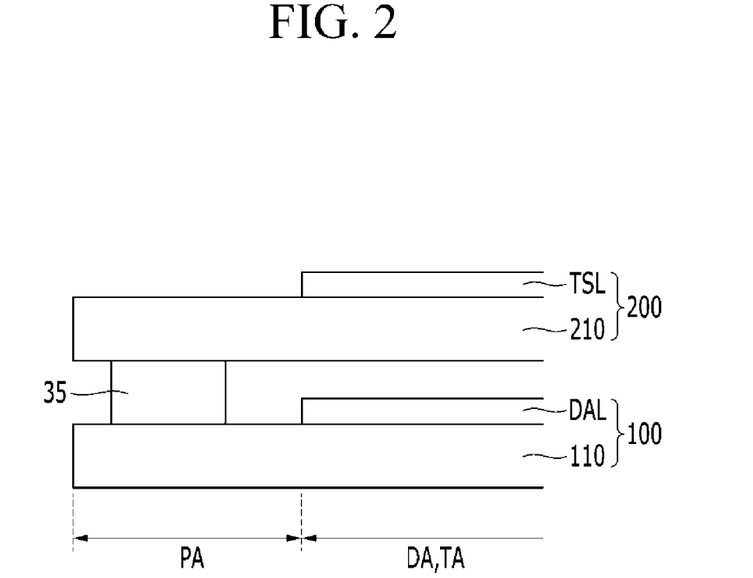
FIG. 2 schematically illustrates a cross-section of the display device shown in FIG. 1 taken along the line A-A.
Figure 3:
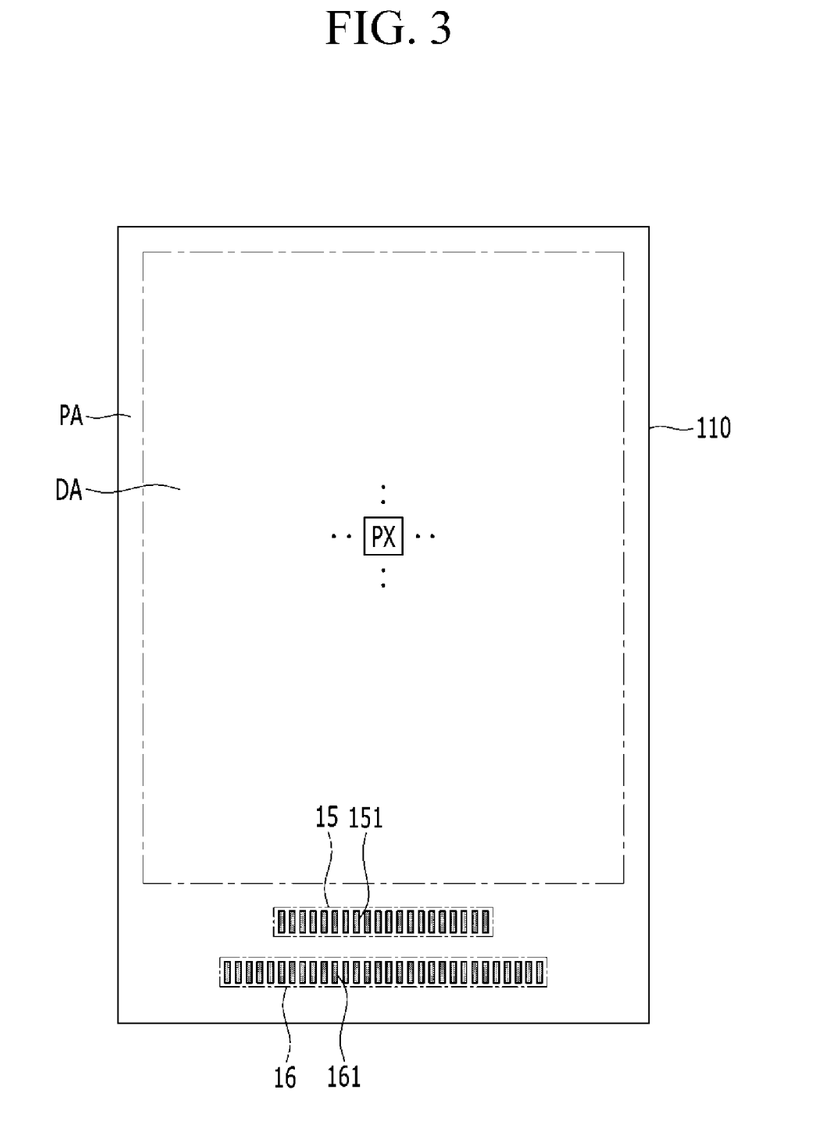
FIG. 3 schematically illustrates a lower panel in the display device shown in FIG.
Figure 4:
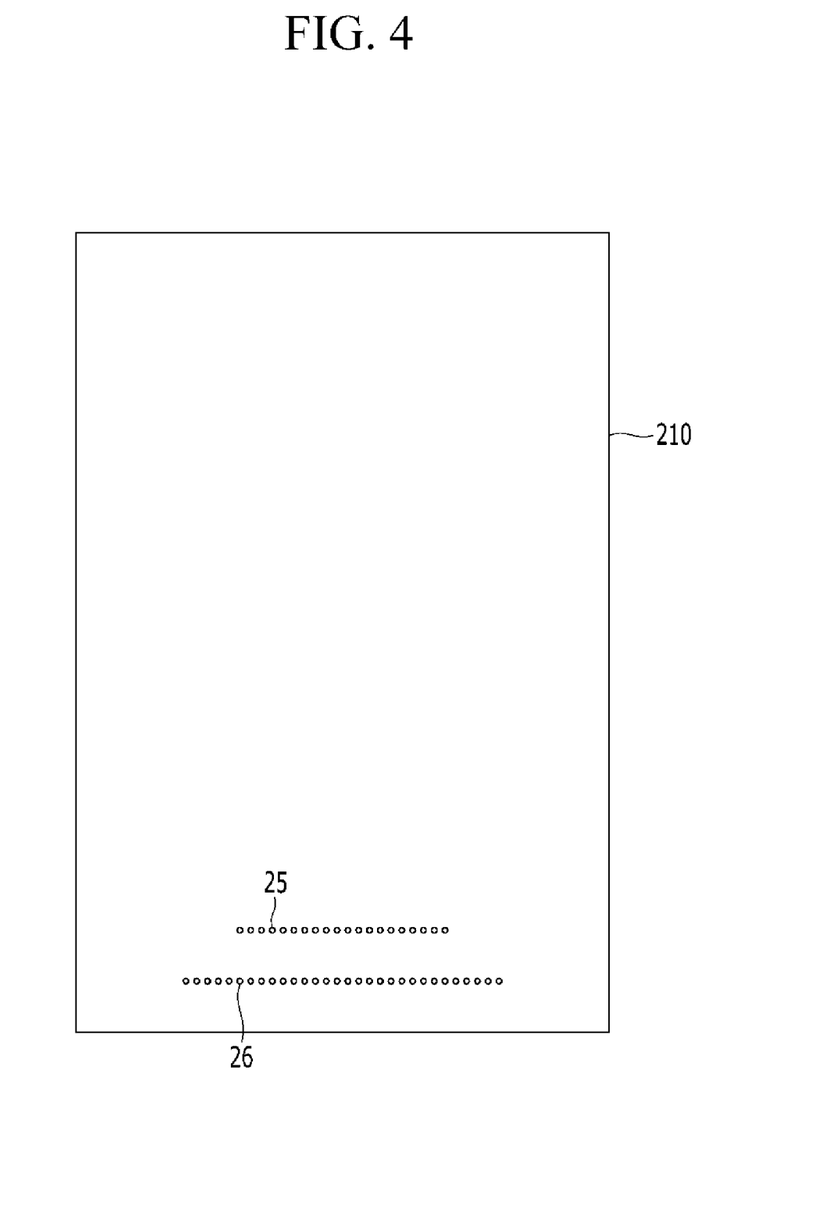
FIG. 4 separately illustrates an upper substrate in the display device shown in FIG. 1.
Figure 5:
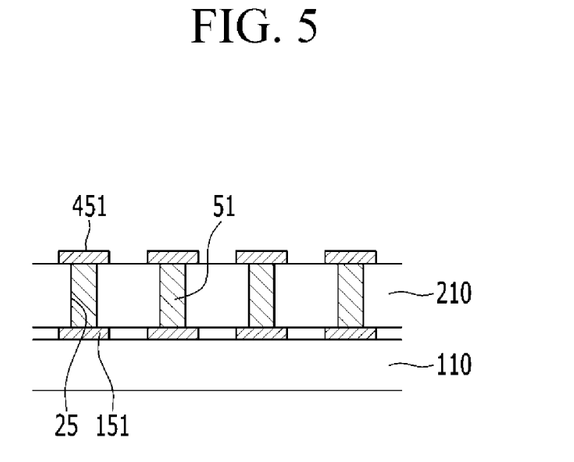
FIG. 5 schematically illustrates a cross-section of the display device shown in FIG. 1 taken along the line B-B.
Figure 6:
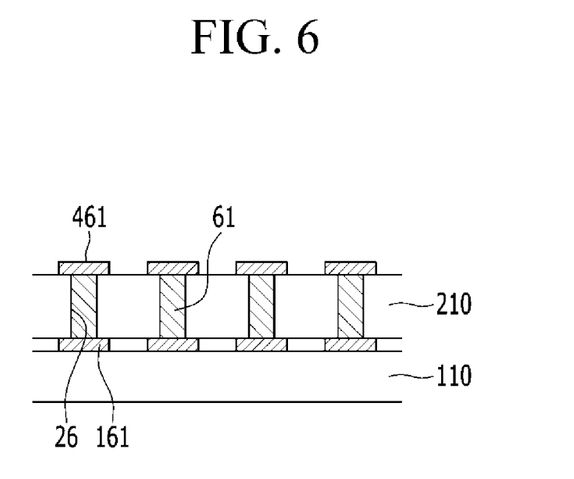
FIG. 6 schematically illustrates a cross-section of the display device shown in FIG. 1 taken along the line C-C.

FIG. 1 schematically illustrates a display device according to an exemplary embodiment, and FIG. 2 schematically illustrates a cross-section of the display device shown in FIG. 1 taken along the line A-A. FIG. 3 schematically illustrates a lower panel in the display device shown in FIG. 1, and FIG. 4 separately illustrates an upper substrate in the display device shown in FIG. 1. FIG. 5 schematically illustrates a cross-section of the display device shown in FIG. 1 taken along the line B-B, and FIG. 6 schematically illustrates a cross-section of the display device shown in FIG. 1 taken along the line C-C.

Referring to FIG. 1, the display device includes display panel 10. Display panel 10 serves to display an image and to sense a touch. Display panel 10 includes display area DA in which the image is actually displayed, and peripheral area PA positioned around display area DA when viewed from a planar structure.

A portion or an entire area of display panel 10 may serve as touch area TA for sensing a touch. Touch area TA is an area which is capable of sensing a touch or a motion as a touch when an object directly touches display panel 10 (contact touch) or hovers while being close to or approaching display panel 10 (non-contact touch). Display area DA and touch area TA may substantially coincide with each other, but are not limited thereto. For example, touch area TA may also be positioned at a portion of peripheral area PA, and touch area TA may be exclusively positioned in display area DA.

As shown in FIG. 2, in display panel 10, lower panel 100 and upper panel 200 are bonded to each other. Lower panel 100 and upper panel 200 may have the same size (i.e., horizontal and vertical lengths) and four edges that coincide with each other.

Lower panel 100 includes lower substrate 110 and display active layer DAL formed thereon. Upper panel 200 includes upper substrate 210 and touch sensing layer TSL formed thereon. Accordingly, display active layer DAL is disposed between lower substrate 110 and upper substrate 210, and touch sensing layer TSL is disposed on upper substrate 210. The surface on which the TSL is disposed does not face lower substrate 110.

Lower substrate 110 and upper substrate 210 are sealed by sealing member 35. Sealing member 35 may be disposed to surround display area DA as a closed curve. When a liquid crystal panel is used as the display panel, a liquid crystal layer may be disposed between lower panel 100 and upper panel 200. When an organic light emitting diode panel is used as the display panel, upper substrate 210 may serve as an encapsulation substrate. Specifically, upper substrate 210 can prevent penetration of moisture and/or oxygen from the outside by sealing common electrode 270 and emission member 370 in FIG. 12, described below.

Display active layer DAL disposed on the lower substrate 100 includes at least one pixel and at least one display signal line (not shown) connected to the pixels and transmitting driving signals, and is mainly disposed at display area DA. The lower substrate 100 may be made of a transparent insulator such as glass or other suitable material. The display signal lines include at least one gate line (not shown) for transmitting gate signals and at least one data line (not shown) for transmitting data signals. The gate lines and the data lines may be disposed to extend to cross each other. The display signal lines may be disposed to extend into peripheral area PA, thereby forming at least one first lower pad 151 of first lower pad unit 15. Some of the display signal lines may form some of at least one second lower pad 161 of second lower pad unit 16.

The pixels may be arranged substantially in a matrix form, but are not limited thereto. Each pixel may include a switching element (not illustrated) connected with the gate line and the data line and a pixel electrode (not illustrated), connected thereto. The switching element may be a three-terminal element such as a thin film transistor integrated with display panel 10. The switching element is turned on and off according to the gate signal transferred by the gate line to selectively transfer the data signal transferred by the data line to the pixel electrode. The pixel may further include a pixel electrode and a common electrode (not illustrated) facing or directionally opposite of the pixel electrode. In the case of an organic light emitting diode display, an emission layer may be disposed between the pixel electrode and the common electrode to form a light emitting element. The common electrode may transfer a common voltage. In the case of a liquid crystal panel, the pixel may include a liquid crystal layer disposed between lower panel 100 and upper panel 200, and the common electrode may be disposed in upper panel 200 or lower panel 100.

In order to implement a color display, each pixel may display one of three or four primary colors, and the desired color may be recognized by combining the primary colors. An example of the primary colors may include three primary colors or four primary colors such as red, green, blue, and the like. Each pixel may further include a color filter disposed at a place corresponding to each pixel electrode and expressing one of the primary colors, and the emission layer included in the light emitting element may emit colored light.

Touch sensing layer TSL formed on upper substrate 210 made of a transparent insulator such as glass includes at least one touch electrode (not shown) and at least one touch signal line (not shown) connected to the touch electrodes to transfer touch signals. Touch sensing layer TSL is mainly disposed on touch area TA. The touch signals include input signals Tx for driving the touch electrodes and output signals Rx that are changed according to whether they are touched. The touch signal lines are disposed to extend into peripheral area PA, thereby forming at least one upper pad 471 of upper pad unit 47.

First connection pad unit 45 including at least one first connection pad 451 and second connection pad unit 46 including at least one second connection pad 461 may be formed in peripheral area PA on upper substrate 210. First connection pad unit 45 and second connection pad unit 46 may be formed at positions so as to correspond to first lower pad unit 15 and second lower pad unit 16 formed on lower substrate 110, respectively. However, such a formation is not necessarily required in the present disclosure, and another connection pad unit and another lower pad unit may be additionally formed.

Referring to FIG. 5 and FIG. 6, first connection pads 451 of first connection pad unit 45 are overlapped with first lower pads 151 of first lower pad unit 15, and are electrically connected thereto. Similarly, second connection pads 461 of second connection pad unit 46 are overlapped with second lower pads 161 of second lower pad unit 16, and are electrically connected thereto. First connection pads 451 and first lower pads 151 may correspond to each other one by one, and second connection pads 461 and second lower pads 161 may correspond to each other one by one. The number of first connection pads 451 may be the same as that of first lower pads 151, and the number of second connection pads 461 may be the same as that of second lower pads 161.

At least one first through hole 25 and at least one second through hole 26 are formed in upper substrate 210 to respectively connect first connection pads 451 and second connection pads 461 formed on upper substrate 210 to first lower pads 151 and second lower pads 161 formed on lower substrate 110. First through holes 25 overlap first lower pads 151 and first connection pads 451, and second through holes 26 overlap second lower pads 161 and second connection pads 461. One through hole or at least one through hole may be formed to overlap a pair of pads, which may consist of a lower pad and a connection pad which overlap each other, in order to connect the lower pad and the connection pad.

In an exemplary embodiment, the first and second through holes 25 and 26 may have a diameter that is in the range of about 5 µm to about 20 µm, but it is not limited thereto. The diameter of first and second through holes 25 and 26 may be variously changed according to the width of connection pads 451 and 461 or lower pads 151 and 161. Further, the diameter of first and second through holes 25 and 26 may be equal to or smaller than the width of connection pads 451 and 461 or lower pads 151 and 161.

First longitudinal connectors 51 and second longitudinal connectors 61 may be made of a conductive material such as a metal, and are respectively formed in first through holes 25 and second through holes 26 to establish an electrical connection between first connection pads 451 and second connection pads 461, and first lower pads 151 and second lower pads 161. Lower ends and upper ends of first longitudinal connectors 51 formed in first through holes 25 respectively contact first lower pads 151 and first connection pads 451, thereby establishing an electrical connection between first lower pads 151 and first connection pads 451. Similarly, lower ends and upper ends of second longitudinal connectors 61 filled in second through holes 26 respectively contact second lower pads 161 and second connection pads 461, thereby accomplishing electrical connection between second lower pads 161 and second connection pads 461.

In an exemplary embodiment, first and second through holes 25 and 26 may be filled with a metal by using liquid metal inkjet printing in order to form first and second longitudinal connectors 51 and 61. Further, intervals between adjacent through holes may be adjusted through an inclination of the nozzle head in order to correspond to a higher resolution.

The formation of first and second longitudinal connectors 51 and 61 by filling a conductive material in first and second through holes 25 and 26, and the contacts between opposite ends of first and second longitudinal connectors 51 and 61, and first and second lower pads 151 and 161, and first and second connection pads 451 and 461, may be performed in various ways. In exemplary embodiments, if first and second longitudinal connectors 51 and 61 are formed by filling a conductive material in first and second through holes 25 and 26 after upper panel 200 in which touch sensing layer TSL has not yet been formed is bonded to lower panel 100, the lower ends of first and second longitudinal connectors 51 and 61 can contact first and second lower pads 151 and 161. Thereafter, when upper pads 471 and touch signal lines of touch sensing layer TSL are formed on upper substrate 210, first and second connection pads 451 and 461 are formed on first and second longitudinal connectors 51 and 61 to overlap upper pads 471 and the touch signal lines. As such, the upper ends of first and second longitudinal connectors 51 and 61 can contact first and second connection pads 451 and 461. In another exemplary embodiment, when upper panel 200 in which first and second longitudinal connectors 51 and 61 have been formed and touch sensing layer TSL and first and second connection pads 451 and 461 have been formed is bonded to lower panel 100, first and second longitudinal connectors 51 and 61 can be connected to first and second lower pads 151 and 161 by using films such as anisotropic conductive films (ACFs).

Figure 7:
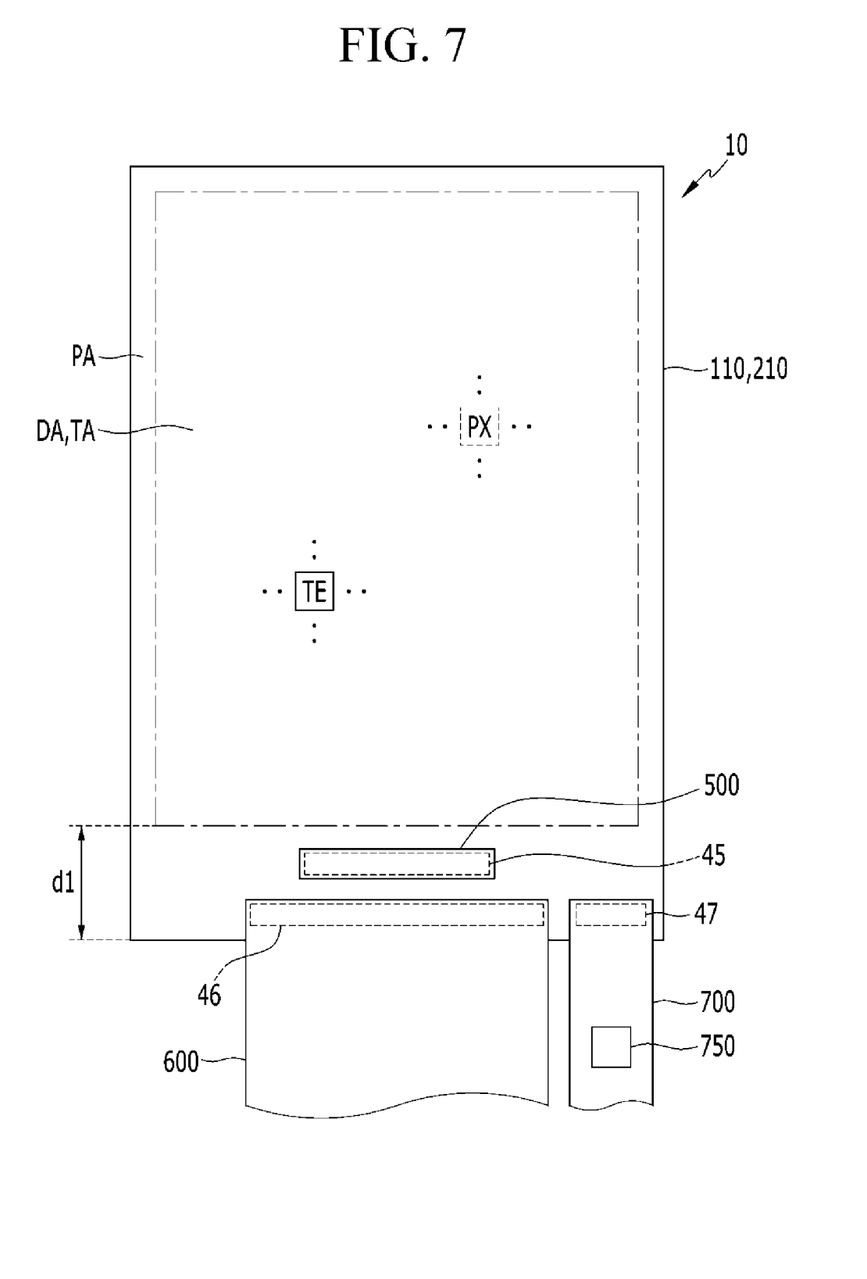
FIG. 7 schematically illustrates a state in which an integrated circuit chip and a flexible circuit board are mounted on and attached to a display panel in a display device according to an exemplary embodiment.

Referring to FIG. 7, display integrated circuit chip 500 including a display driver is mounted on first connection pad unit 45 which is formed on upper substrate 210. The display driver serves to drive the pixels of display active layer DAL, which is disposed in lower panel 100. The display driver included in display integrated circuit chip 500 may include at least one of a data driver, a gate driver, and a display controller.

According to another exemplary embodiment, display integrated circuit chip 500 may be mounted on a display flexible circuit board 600 (specifically, a tape carrier package), or may be mounted on a separate printed circuit board (not shown). Display flexible circuit board 600 serves to supply external signals to the display driver or display active layer DAL in first connection pad unit 45, and may be formed on upper substrate 210.

As such, display integrated circuit chip 500 and display flexible circuit board 600 serving to drive the pixels of display active layer DAL or transmit signals may be mounted on first and second connection pad units 45 and 46 which are formed on upper substrate 210. The connection pads 451 and 461 of the first and second connection pad units 45 and 46 are electrically connected to the lower pads 151 and 161 of the first and second lower pad units 15 and 16 formed on lower substrate 110 through the longitudinal connectors 51 and 61 of through holes 25 and 26. Accordingly, even when display integrated circuit chip 500 and display flexible circuit board 600 are mounted on first and second connection pad units 45 and 46, the external signals and the driving signals may be transmitted to display active layer DAL. As a result, first and second lower pad units 15 and 16 of lower substrate 110 are not required to be exposed, or not be covered by upper substrate 210, in order to mount and attach display integrated circuit chip 500 and display flexible circuit board 600. Thus, it is possible to align the edges of lower substrate 110 and upper substrate 210 with each other and coinciding sizes of lower substrate 110 and upper substrate 210 with each other. Accordingly, since lower substrate 110 and upper substrate 210 may accommodate a side impact together, the probability of being damaged by the side impact may be reduced in comparison with a case where the impact is applied to a lower substrate 110 which is formed longer.

In one or more exemplary embodiments, touch sensor flexible circuit board 700 serving to transmit signals to touch sensing layer TSL may be attached to the upper pad unit 47. Touch sensor integrated circuit chip 750 including a touch sensor driver for driving a touch sensor is mounted on touch sensor flexible circuit board 700. The touch sensor driver included in touch sensor integrated circuit chip 750 may be a touch sensor controller.

According to another exemplary embodiment, touch sensor integrated circuit chip 750 may be directly mounted on upper pad unit 47, or may be mounted on a separate printed circuit board (not shown).

As shown in FIG. 7, the touch sensor flexible circuit board 700 may be mounted on and attached to upper substrate 210 to be parallel with display flexible circuit board 600.

Figure 8:
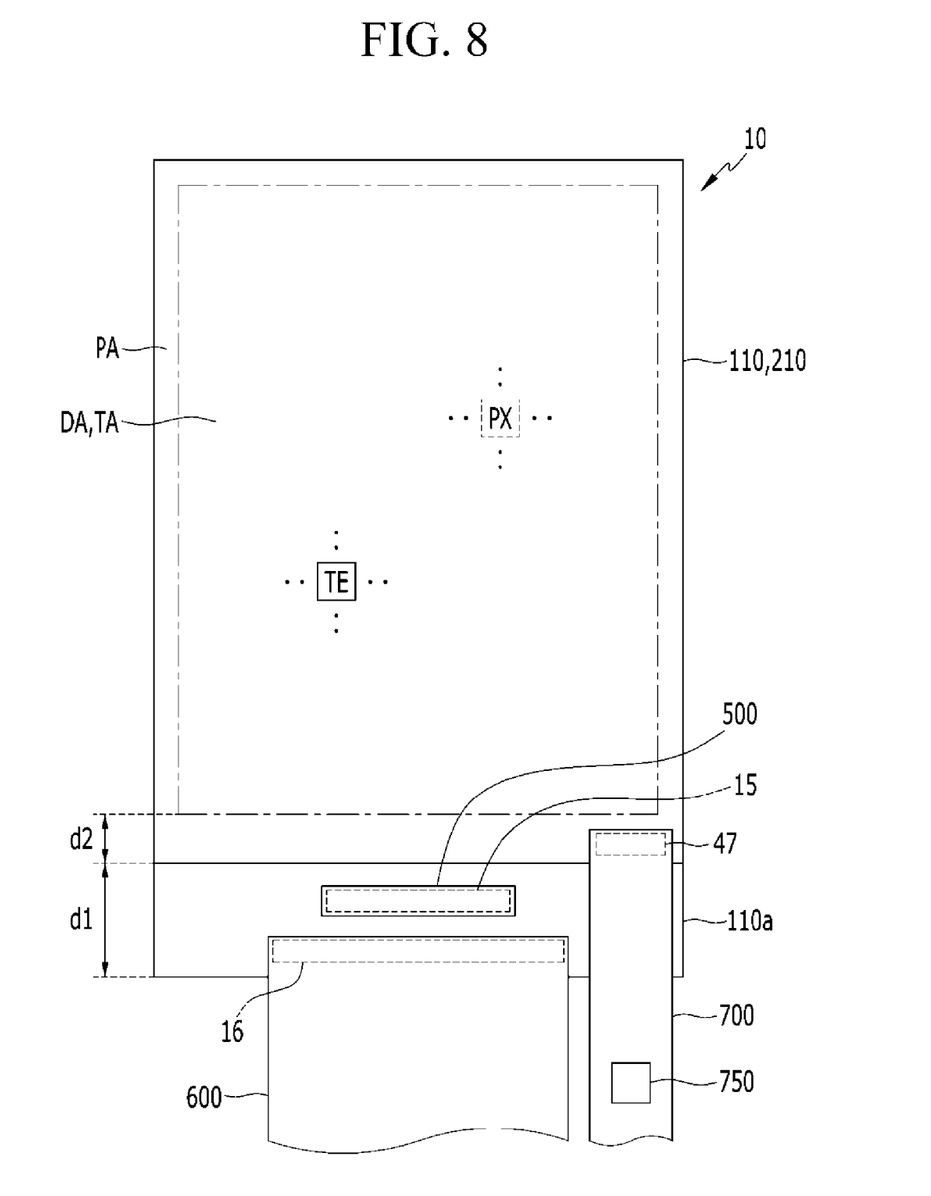
FIG. 8 schematically illustrates a state in which an integrated circuit chip and a flexible circuit board are mounted on and attached to a display panel in a display device according to a comparative embodiment.

Referring to FIG. 8, it is illustrated that an integrated circuit chip and a flexible circuit board are mounted on and attached to a typical display device, respectively. Unlike in the aforementioned exemplary embodiment, a through hole is not formed in upper substrate 210, and first and second connection pad units are not formed on upper substrate 210 in the exemplary embodiment of FIG. 8. Accordingly, display integrated circuit chip 500 and display flexible circuit board 600 are respectively mounted on and attached to first lower pad unit 15 and second lower pad unit 16 on lower substrate 110.

Lower substrate 110 includes extended portion 110a that is not overlapped with upper substrate 210 to prevent first and second lower pad units 15 and 16 from being covered by upper substrate 210. Accordingly, if a side impact is applied to a corresponding edge of display panel 10, only extended portion 110a of lower substrate 110 is affected by the side impact. Thus, as in the exemplary embodiment of FIG. 7, the display device is formed such that edges of lower substrate 110 and upper substrate 210 are aligned with each other. In this case, display device 10 has a higher probability of being damaged than the case in which the side impact affects both of lower substrate 110 and upper substrate 210.

In one or more exemplary embodiments, touch sensor flexible circuit board 700 is attached to upper pad unit 47 formed in upper substrate 210. An Upper pad unit 47 formed in upper substrate 210 is not allowed to be aligned with first and second lower pad units 15 and 16 in order to expose first and second lower pad units 15 and 16 formed in lower substrate 110, and thus the width of the peripheral area is increased by d2 in the exemplary embodiment of FIG. 8.

In one or more exemplary embodiments, the case of the exemplary embodiment of the present disclosure in which lower substrate 110 has the same size as upper substrate 210, display integrated circuit chip 500, display flexible circuit board 600, and touch sensor flexible circuit board 700 may be mounted and attached in the peripheral area having a width of d1. In contrast, in the case of the exemplary embodiment of FIG. 8, display integrated circuit chip 500 and display flexible circuit board 600 may by mounted and attached in the peripheral area having the width of d1, and touch sensor flexible circuit board 700 may be attached to the peripheral area having the width of d2. As a result, it may be possible to reduce the width of the peripheral area in which the pad unit is located, thereby accomplishing a reduction of the display device by the reduced width or assigning the remaining area to other components.

A touch sensor and a pixel of a display device according to an exemplary embodiment of the present disclosure will be described in more detail with respect to FIG. 9 to is FIG. 12. The touch sensor may sense a contact in various ways. The touch sensor may be classified into various types such as a resistive type, a capacitive type, an electromagnetic type, and an optical type. In the present exemplary embodiment, a capacitive touch sensor will be described.

Figure 9:
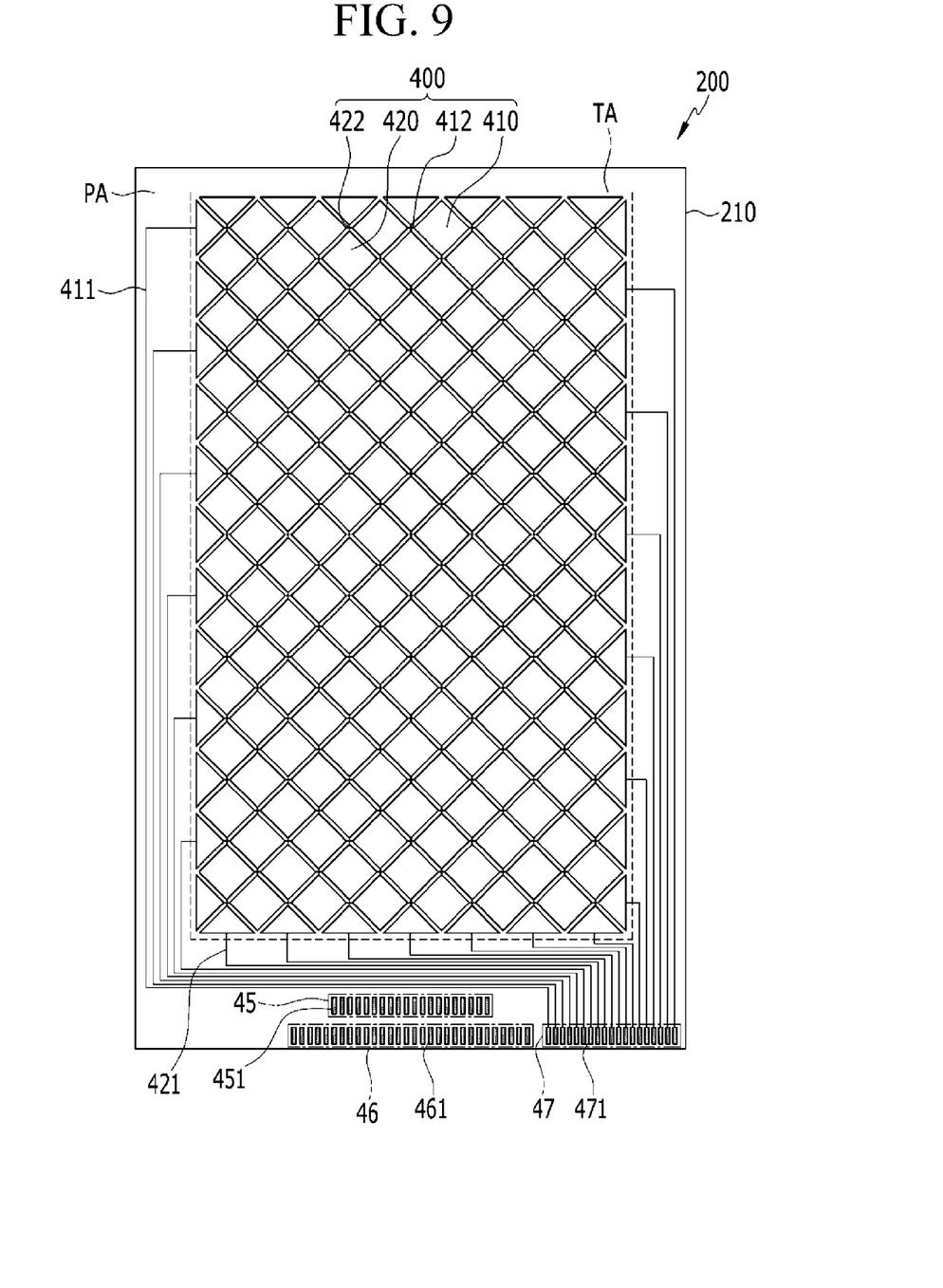
FIG. 9 is a top plan view illustrating a touch sensor of a display device according to an exemplary embodiment.

Referring to FIG. 9, the touch sensor 400 formed on upper substrate 210 may include at least one touch electrode 410 and 420. The touch electrodes may include at least one first touch electrode 410 and at least one second touch electrode 420. First touch electrodes 410 and second touch electrodes 420 may be separated from each other.

First touch electrodes 410 and second touch electrodes 420 may be disposed to be alternately distributed such that they do not overlap each other in touch area TA. First touch electrodes 410 may be disposed along a column direction and a row direction, and second touch electrodes 420 may be disposed along a column direction and a row direction.

The first touch electrodes 410 and the second touch electrodes 420 may be disposed at the same layer, or at different layers. First touch electrodes 410 and second touch electrodes 420, respectively, may have a substantially quadrangular shape, a polygonal shape such as a hexagonal, or a curved shape such as a circle or oval. Further, first touch electrodes 410 and second touch electrodes 420 may have various forms such as a protrusion to improve the sensitivity of the touch sensor.

At least some of first touch electrodes 410 arranged in the same row or column may be connected to each other or separated from each other inside or outside touch area TA. Similarly, at least some of second touch electrode 420 arranged in the same column or row may be connected to each other or separated from each other inside or outside touch area TA. For example, as illustrated in FIG. 9, when first touch electrodes 410 disposed in the same row are connected to each other inside touch area TA, second touch electrodes 420 disposed in the same column may be connected to each other inside touch active area TA. In other words, first touch electrodes 410 disposed in each row may be connected to each other through first connector 412, and second touch electrodes 420 disposed in each column may be connected to each other through second connector 422.

Figure 10:
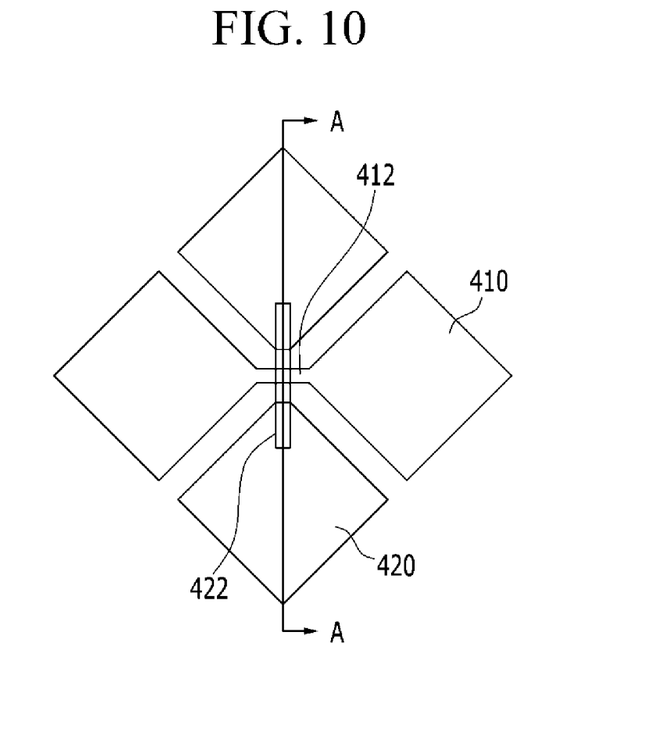
FIG. 10 is a partially enlarged view of the touch sensor shown in FIG. 9.
Figure 11:
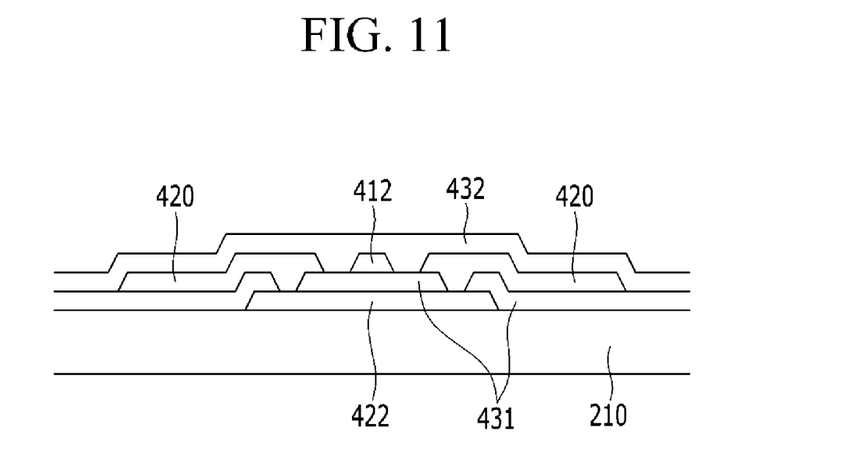
FIG. 11 is a cross-sectional view illustrating the touch sensor shown in FIG. 10 taken along the line A-A.
Figure 12:
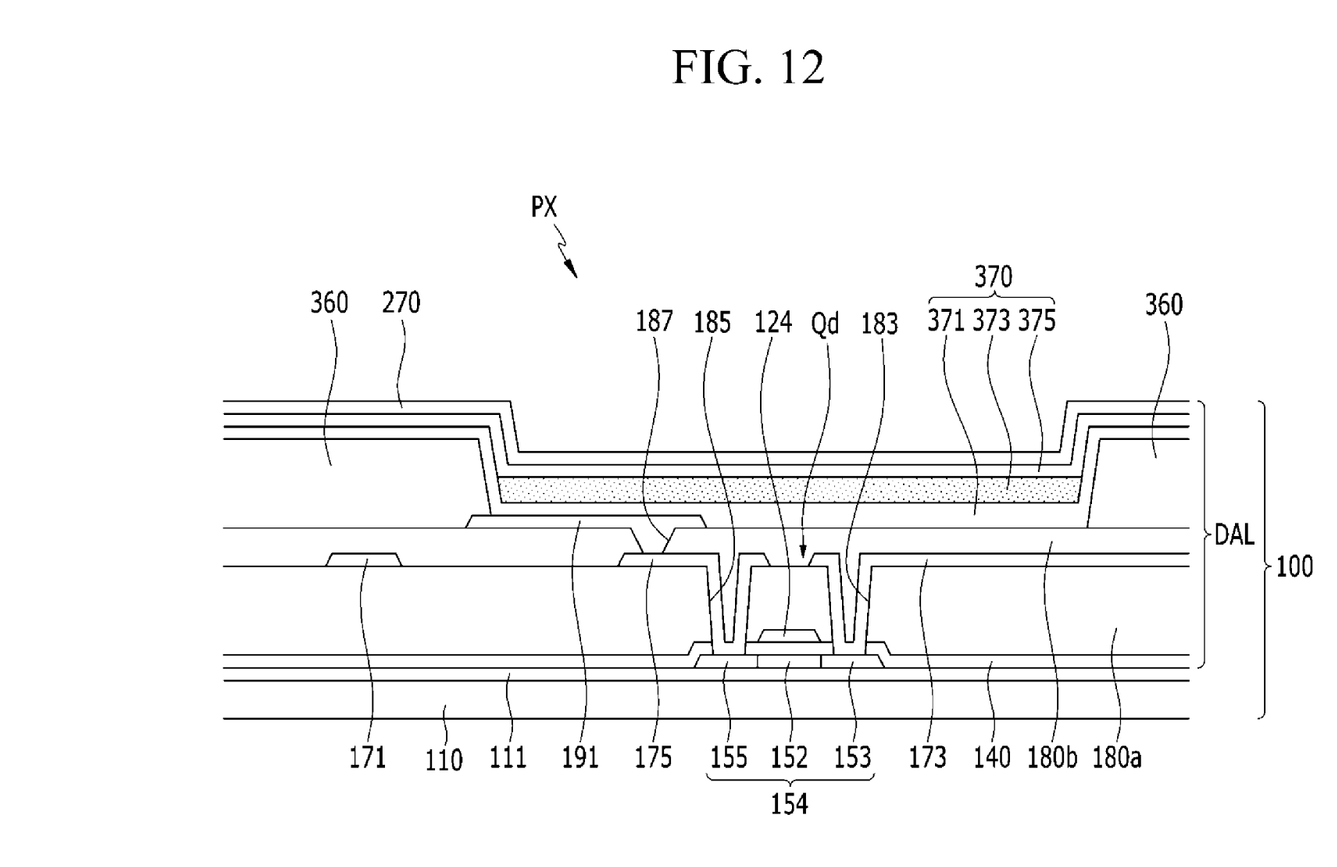
FIG. 12 is a cross-sectional view illustrating a pixel formed at a lower substrate in a display device according to an exemplary embodiment.

Referring to FIG. 10 and FIG. 11, second connector 422 is disposed on upper substrate 210 to connect adjacent second touch electrodes 420, and first insulating layer 431 is formed thereon. First connector 412 is disposed on first insulating layer 431 to connect first touch electrodes 410 with second touch electrodes 420, and to adjacent first touch electrodes 410. A second insulating layer 432 is formed on first touch electrodes 410, second touch electrodes 420, and first connectors 412 to protect them.

Second touch electrodes 420 are electrically connected to second connectors 422 through contact holes formed in first insulating layer 431. Some of first connectors 412 may be disposed to overlap second connectors 422, but are physically separated and electrically insulated therefrom by first insulating layer 431. First touch electrodes 410, second touch electrodes 420, and first connectors 412 may be made of the same material, and may be simultaneously patterned. Second connectors 422 may be made of a same material as that of touch signal lines 411 and 421, and may be simultaneously patterned.

Second touch electrode 420 and first connector 412 may be disposed at the same layer on upper substrate 210, and second connector 422 may be formed on second touch electrode 420 and first connector 412, with first insulating layer 431 therebetween. Alternatively, second connectors 422 serving to connect adjacent second touch electrodes 420 may be disposed on the same layer as that of first touch electrode 410 to be integrated with second touch electrode 420, and first connectors 412 serving to connect adjacent first touch electrodes 410 may be disposed on a layer that is different from that of first touch electrodes 410. In addition, various modifications for connecting the touch electrodes may be performed.

Referring to FIG. 9 again, first touch electrodes 410 of each column that are connected to each other may be connected to a touch sensor controller (not shown) through first touch signal line 411, and second touch electrodes 420 of each row that are connected to each other may be connected to the touch sensor controller through second touch signal line 421. As shown therein, first touch signal line 411 and second touch signal line 421 are disposed in peripheral area PA of display panel 10, but may be disposed in touch area TA.

At least one upper pad 471 serving as a pad for touch sensing layer TSL is formed at end portions of first touch signal line 411 and second touch signal line 421 in peripheral area PA of display panel 10. Further, as described above, first connection pads 451 and second connection pads 461 are formed in peripheral area PA in which the upper pads are disposed, on upper substrate 210, and are electrically connected to first lower pads 151 and second lower pads 161 formed on lower substrate 110 through holes 25 and 26 formed on upper substrate 210. Although first and second lower pads 151 and 161 and first and second connection pads 451 and 461 are respectively formed in lower substrate 110 and upper substrate 210, all of them may serve as pads for display active layer DAL which is formed in lower substrate 110.

First touch signal line 411, second touch signal line 421, and upper pad 471 may be made of a low resistance material such as molybdenum (Mo), silver (Ag), titanium (Ti), copper (Cu), aluminum (Al), and molybdenum/aluminum/molybdenum (Mo/Al/Mo), or may be made of a transparent conductive material such as the material the first touch electrodes 410 and the second touch electrodes 420 are made of. First connection pads 451 and second connection pads 461 may be made of the same material as that of first touch signal line 411, second touch signal line 421, and upper pad 471, and may be simultaneously patterned.

First touch electrodes 410 and second touch electrodes 420 may have a minimum optical transmittance rate of a predetermined level to allow light transferred from display panel 10 to pass therethrough. For example, first touch electrodes 410 and second touch electrodes 420 may be formed of transparent conductive materials such as indium tin oxide (ITO), indium zinc oxide (IZO), a thin metal layer such as a silver nanowire (AgNW), a metal mesh, carbon nanotubes (CNT), etc., but are not limited thereto.

First touch electrode 410 and second touch electrode 420, which are adjacent to each other, constitute a mutual capacitor serving as a touch sensor. The mutual capacitor may receive a driving signal through one of first touch electrode 410 and second touch electrode 420, and may output a sensing signal indicating a change in a charge amount caused by a touch of an external object through the other touch electrode.

Distinguished from FIG. 9, FIG. 10, and FIG. 11, first touch electrodes 410 may be separated from each other and second touch electrodes 420 may be separated from each other to form independent touch electrodes, and may be connected to the touch sensor controller through their own touch wires (not shown). In this case, each touch electrode constitutes a self-capacitor as a touch sensor. The self-capacitor may be charged to a predetermined level by receiving a driving signal. The charged amount is changed when the self-capacitor is contacted by an external object such as a finger, and thus the self-capacitor may output a sensing signal that is different from an inputted driving signal.

The display device includes lower substrate 110 and at least one layer thereon. Buffer layer 111 may be disposed immediately on lower substrate 110.

Lower substrate 110 is made of a transparent insulating material such as glass or plastic. For example, lower substrate 110 may be made of borosilicate glass with a heat-resistance temperature of 600° C. or more. Lower substrate 110 may be made of a plastic such as polyethylene terephthalate (PET), polyethylene naphthalate (PEN), and polyimide (PI), and a plastic substrate may be applied as a flexible substrate.

Buffer layer 111 may be formed to prevent impurities from deteriorating characteristics of the semiconductors, or to prevent moisture or external air from permeating and planarizing the covered surface. Buffer layer 111 may also be called a blocking layer or a barrier layer. Buffer layer 111 may include silicon nitride (SiNx), silicon oxide (SiOx), silicon oxynitride (SiOxNy), and the like, and may be formed as a single layer or in multiple layers. Buffer layer 111 may be omitted, depending on the kind of substrate used or processing conditions employed.

Display active layer DAL including at least one thin film may be disposed on buffer layer 111. Display active layer DAL may include at least one pixel and various signal lines such as the gate lines and data lines described above.

Exemplary embodiments of display active layer DAL will be described with reference to FIG. 12. At least one semiconductor 154 is disposed on buffer layer 111. Semiconductor 154 may include channel region 152 with source region 153 and drain region 155 formed at opposite sides of channel region 152 by a doping process. Semiconductor 154 may include amorphous silicon, polysilicon, or an oxide semiconductor.

Gate insulating layer 140 may be disposed on semiconductor 154. In this exemplary embodiment, gate insulating layer 140 may be formed of an inorganic insulator such as a silicon nitride, a silicon oxide, or a silicon oxynitride.

At least one gate conductor including at least one gate lines (not shown) and control electrode 124 may be disposed on the gate insulating layer 140. Control electrode 124 may overlap part of semiconductor 154, including channel region 152.

First passivation layer 180a may be positioned on gate insulating layer 140 and the gate conductor. First passivation layer 180a and gate insulating layer 140 may include contact hole 183, exposing source region 153 of semiconductor 154, and contact hole 185 exposing drain region 155.

At least one data conductor including at least one data line 171, at least one input electrode 173, and at least one output electrode 175 may be formed on first passivation layer 180a. Data line 171 may be disposed to cross the scanning signal line and to serve to transfer a data signal. Input electrode 173 may be connected to data line 171. Output electrode 175 may be separated from data line 171. Input electrode 173 and output electrode 175 may be disposed to face each other on semiconductor 154.

Input electrode 173 and output electrode 175 may be connected to source region 153 and drain region 155 of semiconductor 154 through contact holes 183 and 185, respectively.

Control electrode 124, input electrode 173, and output electrode 175 constitute driving thin film transistor Qd together with semiconductor 154. However, the structure of driving thin film transistor Qd may be variously modified without being limited thereto.

Second passivation layer 180b may be disposed on the data conductor. In exemplary embodiments, second passivation layer 180b may be made of an inorganic insulator such as a silicon nitride or a silicon oxide. Second passivation layer 180b may accomplish a flat surface in order to increase light emission efficiency of the emission member to be formed thereon. Contact hole 187 is formed in second passivation layer 180b to expose output electrode 175.

At least one pixel electrode 191 may be disposed on second passivation layer 180b. Pixel electrode 191 of each pixel may be physically and electrically connected to output electrode 175 through contact hole 187 of second passivation layer 180b. Pixel electrode 191 may include a translucent conductive material layer or a reflective conductive material.

Pixel defining layer 360 (also referred to a partition wall) having at least one opening exposing pixel electrode 191 may be disposed on second passivation layer 180b. The openings of pixel defining layer 360 exposing pixel electrode 191 may define each pixel area. However, pixel defining layer 360 may be omitted.

Emission member 370 may be positioned on pixel defining layer 360 and pixel electrode 191. Emission member 370 may include first organic common layer 371, at least one emission layer 373, and second organic common layer 375, which may be stacked in that order.

First organic common layer 371 may include at least one of a hole injecting layer (HIL) and a hole transport layer (HTL). When first organic common layer 371 includes both the hole injecting layer and the hole transport layer, the hole injecting layer and the hole transport layer may be successively stacked. First organic common layer 371 may be formed all over the display area in which the pixels are disposed, and may also be formed only in each pixel area.

Emission layer 373 may be positioned on pixel electrode 191 of each corresponding pixel. Emission layer 373 may be made of an organic material which uniquely emits light of the primary colors such as red, green, and blue, and may have a structure in which at least one organic material layer emitting light of different colors are stacked.

In exemplary embodiments, second organic common layer 375 may include at least one of an electron transport layer (ETL) and an electron injecting layer (EIL). When second organic common layer 375 includes the electron transport layer and the electron injecting layer, the electron transport layer and the electron injecting layer may be successively stacked.

First and second organic common layers 371 and 375 are layers for improving light emitting efficiency of emission layer 373, and either one of first and second organic common layers 371 and 375 may be omitted.

Common electrode 270 serving to transfer a common voltage may be disposed on emission member 370. Common electrode 270 may include a transparent conductive material. For example, common electrode 270 may be made of a transparent conductive material such as ITO or IZO, or may be formed by thinly stacking metals of calcium (Ca), barium (Ba), magnesium (Mg), aluminum (Al), silver (Ag), and the like to allow light transmission. Common electrode 270 may have a dual-layered structure of a metal layer and a transparent conductive material layer. An insulating layer (not shown) may be disposed on common electrode 270.

The pixel electrode 191, emission member 370, and common electrode 270 of each pixel constitute the emission element, and one of pixel electrode 191 and common electrode 270 may serve as a cathode, while the other electrode may serve as an anode. In exemplary embodiments, pixel electrode 191 serves as the anode and common electrode 270 serves as the cathode.

The display device may be a top emission type in which an image is displayed by upwardly emitting light from emission member 370.

In the display device according to an exemplary embodiment, the display integrated circuit chip and the flexible circuit board which are conventionally mounted on and attached to the lower substrate can be mounted on and attached to the upper substrate. As a result, it is not necessary to form the lower substrate longer than the upper substrate to acquire such an attachment area conventionally required. If the lower substrate is longer than the upper substrate, the longer portion is vulnerable to a side impact. However, according to the exemplary embodiment of the present disclosure, the lower substrate can be formed to have substantially the same size as that of the upper substrate, thereby improving side impact reliability.

In addition, since the pad unit on or to which the display driver or the flexible circuit board is mounted or attached and the pad unit on or to which the touch flexible circuit board is mounted and attached can be disposed substantially in parallel in the upper substrate, a dead space can be reduced as compared with the case they are disposed in the different substrates.

In brief, the display device according to the exemplary embodiment of the present disclosure can have a more compact and stronger structure.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
   a display panel comprising:
      a lower substrate having a first surface and a second surface opposite to each other;
      an upper substrate having a first surface and a second surface opposite to each other, the upper substrate being disposed on the lower substrate such that the second surface of the upper substrate faces the first surface of the lower substrate;
      a display active layer disposed between the lower substrate and the upper substrate;
      a lower pad disposed on the first surface of the lower substrate;
      a touch sensing layer disposed on the first surface of the upper substrate;
      a connection pad disposed on the first surface of the upper substrate; and
      a flexible circuit board attached to the connection pad on the first surface of the upper substrate,
   wherein the upper substrate has a through hole formed therein,
   the connection pad is electrically connected to the lower pad through a connector disposed in the through hole of the upper substrate,
   the diameter of the through hole is smaller than a width of both the connection pad and the lower pad; and
   the connector consists of electrically conductive material disposed within the through hole of the upper substrate.

2. The display device of claim 1, wherein the connection pad disposed on the first surface of the upper substrate overlaps the lower pad disposed on the first surface of lower substrate.

3. The display device of claim 2, comprising multiple lower pads and an identical number of connection pads.

4. The display device of claim 1, wherein a lower end of the connector contacts the lower pad and an upper end of the connector contacts the connection pad.

5. The display device of claim 1, wherein the flexible circuit board is
   a flexible display circuit board.

6. The display device of claim 1, further comprising
   an upper pad disposed on the first surface of the upper substrate.

7. The display device of claim 6, further comprising
   a flexible touch circuit board attached to the upper pad.

8. The display device of claim 6, wherein the display panel comprises a display area and a peripheral area around the display area, and
   the lower pad, the upper pad, and the connection pad are disposed in the peripheral area.

9. The display device of claim 6, wherein the upper pad and the connection pad are made of a same material.

10. The display device of claim 1, wherein the lower substrate and the upper substrate have a substantially identical size and edges of the lower substrate and the upper substrate are substantially aligned with each other.

11. The display device of claim 1, wherein the lower pad comprises a first lower pad and a second lower pad, and wherein the connection pad comprises a first connection pad connected to a first lower pad and a second connection pad connected to a second lower pad.

12. The display device of claim 11, further comprising multiple lower pads and multiple connection pads.

13. The display device of claim 12, further comprising:
   a display integrated circuit chip mounted on the first connection pads; and
   a display flexible circuit board attached to the second connection pads.

14. The display device of claim 1, wherein the display active layer comprises an emission layer.

15. The display device of claim 1, wherein the display active layer comprises a liquid crystal layer.

16. A display device comprising:
   a display panel comprising:
      a lower substrate having a first surface and a second surface opposite to each other;
      an upper substrate having a first surface and a second surface opposite to each other, the upper substrate being disposed on the lower substrate such that the second surface of the upper substrate faces the first surface of the lower substrate;
      a display active layer disposed between the lower substrate and the upper substrate;

a lower pad disposed on the first surface of the lower substrate;
a touch sensing layer disposed on the first surface of the upper substrate;
a connection pad disposed on the first surface of the upper substrate; and
a display integrated circuit chip mounted on the connection pad on the first surface of the upper substrate,
wherein the upper substrate has a through hole formed therein,
the connection pad is electrically connected to the lower pad through a connector disposed in the through hole of the upper substrate,
the diameter of the through hole is smaller than a width of both the connection pad and the lower pad; and
the connector consists of electrically conductive material disposed within the through hole of the upper substrate.

\* \* \* \* \*